Jan. 27, 1953     E. L. KRIEBLE     2,626,709
LIQUID SEPARATOR
Filed June 4, 1948
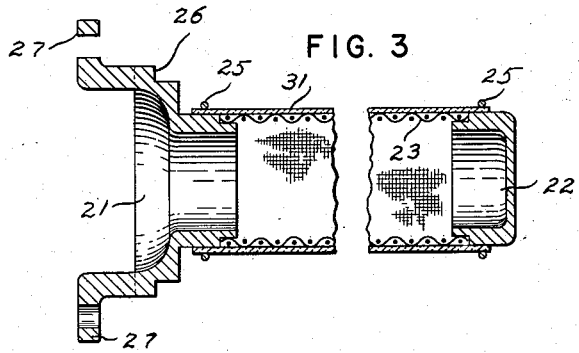
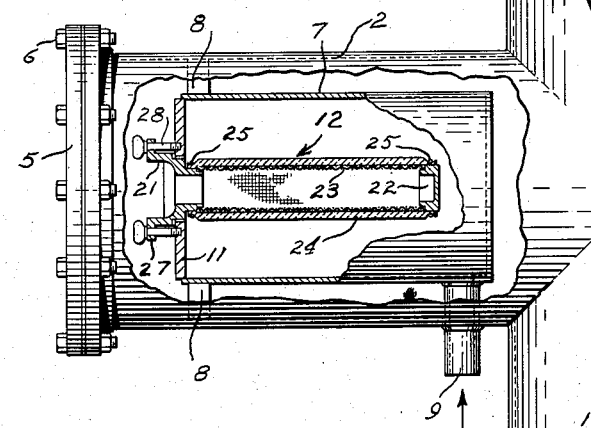
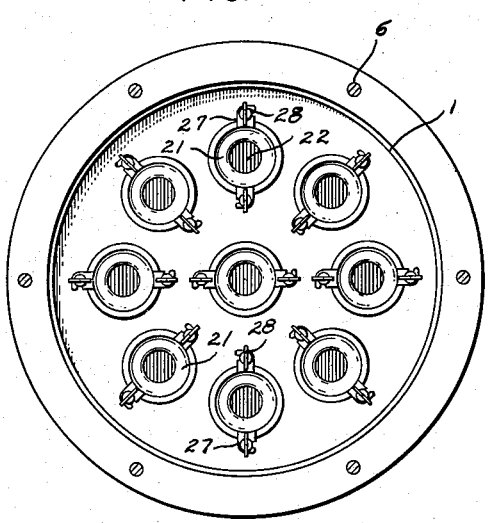
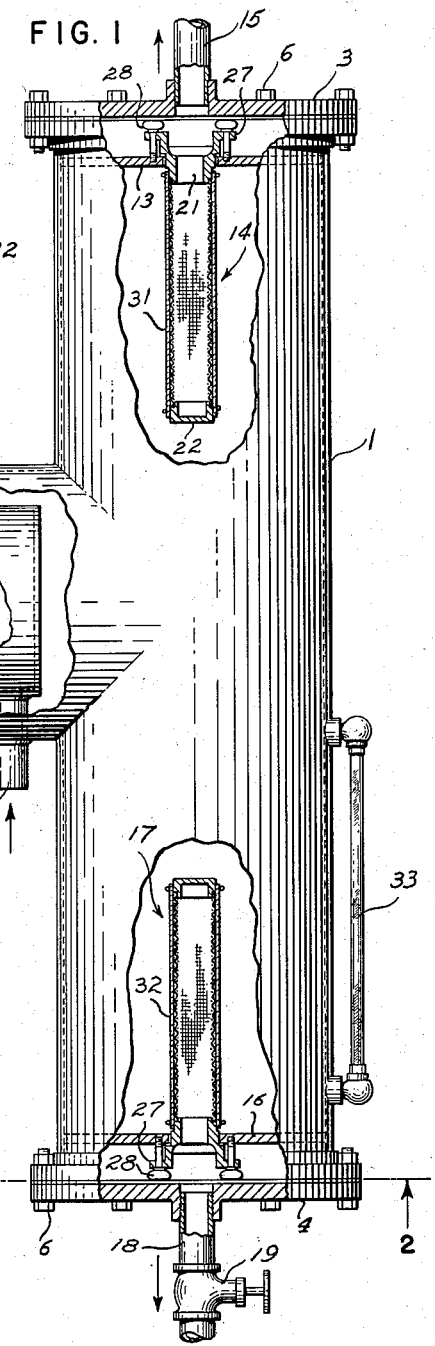
INVENTOR.
*Elvin L. Krieble*
BY *E. Wellford Mason*
ATTORNEY.

Patented Jan. 27, 1953

2,626,709

UNITED STATES PATENT OFFICE 2,626,709

LIQUID SEPARATOR

Elvin L. Krieble, Lansdale, Pa., assignor to Selas Corporation of America, Philadelphia, Pa., a corporation of Pennsylvania Application June 4, 1948, Serial No. 31,122

11 Claims. (Cl. 210—43)

The present invention relates to liquid separators, and more particularly to liquid separators for separating large volumes of immiscible liquids such as hydrocarbons and water.

At the present time there are available several devices for separating immiscible liquids. Most of the devices of this type of which I am aware, however, are adapted to handle relatively small quantities of liquid per unit time, and are relatively complicated.

It is an object of the invention to provide a separator for immiscible liquids, which will be described herein by way of example as a light hydrocarbon and water, that has a relatively large capacity. It is a further object to provide a separator that is simple in construction, and one in which the parts may be easily disassembled and assembled for the purpose of cleaning or replacing the separating elements.

It is a further object of the invention to provide a liquid separating device that can be sold as a complete unit ready to be installed in a pipe through which the liquids to be separated are flowing. It is a further object of the invention to provide a separating device for immiscible liquids in which complete and positive separation of the liquids is accomplished.

With the device of the present invention, the liquids to be separated are passed through a plurality of coalescing membranes acting in parallel which serve to coalesce the dispersed phase in the continuous phase of the liquid. The two liquids are then passed through an elongated path during which the heavier phase starts to separate by gravity from the lighter phase. Positive separation of the liquids is completed by passing them through separating membranes that are treated, respectively, to pass only one of the liquids. In other words, one membrane is treated to pass one liquid and repel the other, while the second membrane is treated to repel the first liquid and pass the second.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a view, partly in section, of the separator;

Figure 2 is a view taken on line 2—2 of Figure 1; and

Figure 3 is an enlarged view of one of the separator units.

Referring to the drawing, it will be seen that the separator comprises a vertically extending cylindrical casing 1 which has a horizontally projecting portion 2 extending from it. These two portions together form the outer casing of the separator unit into which the liquids to be separated are introduced, and from which the separated liquids are withdrawn. The upper end of the cylindrical unit is covered by a cap 3 and the lower end is covered by a cap 4. In a similar manner the outer end of the horizontal projection is covered by a cap 5. Each of these caps is held in place against a flange that is provided on the end of the casing by means of suitable bolts 6. Preferably, there is provided between each of the caps and its respective flange a gasket in order that a liquid tight connection may be made between the various parts.

Located within the horizontally projecting portion 2 of the outer casing is a closed cylindrically shaped chamber 7 of small diameter than the horizontally projecting portion. This chamber is supported in place in the projecting portion by means of a number of supports 8 on its outer end, and at its inner end is supported by a tubular inlet 9 that extends from the outside of the unit into the interior of chamber 7. The outer end of the chamber is closed by a cap 11 that is preferably welded or brazed to the cylinder forming the chamber itself and is provided with a number of openings in which are placed coalescing units 12. For purposes of clearness only one of the coalescing units is shown in the drawing but it is to be understood that a number of these units will be used depending upon the capacity for which the separator is designed.

The top portion of the chamber 1 has in it a partition 13 that is also suitably fastened in place as by welding. This partition is also provided with a number of openings that are adapted to receive separating units 14. In a like manner the lower portion of the casing is provided with a partition 16 that has a number of openings formed in it through which are provided separating units 17. Only one of the separating units has been shown in each of the partitions 13 and 16 in Figure 1. A number of the units may be arranged in each of these partitions, as well as in cap 11, as shown in Figure 2, if it is desired. The number of separating units that are used in the upper partition 13 and the lower partition 16 will be dependent entirely upon the capacity of the separator and the amount of liquid that is to be passed through it. The upper cap 3 is provided with an outlet 15 for one of the liquids that is to be separated from the mixture, while the lower cap 4 is provided with an outlet 18 for the other of the liquids of the mixture. There is also provided a valve 19 in the outlet 18.

Each of the separating units 14 and 17, as well as the coalescing units 12, are constructed in a similar manner. These units differ from each other only in the type of membrane that is used, the type depending upon the function of the unit. From an inspection of Figure 3 of the drawing it will be seen that each separator unit is composed of a cylindrical casting 21 and a cup-shaped casting 22 which are rigidly joined together by a wire screen 23. This screen is formed into a tube and is suitably brazed to flanges that are provided on the two castings. Casting 21 has a flange 26 on its surface which abuts against the outer surface of the partition through which it is inserted, and is provided with a pair of U-shaped ears 27 that are received by thumb screws 28 extending into the partition which receives the separating unit. Gaskets are preferably used between the casting 21 and the partition in which it is received. As shown in the drawing, if the unit is to be used for the coalescing function of the separator a coalescing membrane 24 is wrapped around the screen 23 and is tied in lace at each end by means of suitable ties 25 that can take the form of wires which are wrapped tightly around the two castings in such fashion that a liquid-proof joint is provided. The coalescing membrane can be made of any suitable material that is fibrous in character such as glass wool so that as the mixture is forced through it the liquid will be filtered and the dispersed phase will be coalesced in the continuous phase.

Assuming that the mixture to be separated is one of hydrocarbon and water, the continuous phase being a light hydrocarbon and the dispersed phase being water, the separating unit 14 will have wrapped around the screen 23 a membrane 31 that has been treated to be hydrophobic. Also with the example given, the separating unit 17 will have wrapped around the screen a membrane 32 that is treated to be hydrophilic. These membranes are made of a material having small pores formed therein, such as a glass fabric. A membrane of glass fabric, for example, has the natural characteristic of being hydrophilic and, therefore, needs no treatment other than a thorough cleaning. In order to render a membrane of glass fabric, for example, hydrophobic it may be treated with metallic soaps, silicones or an organo-silicon halide. The type of treatment performed forms no part of the present invention. It is sufficient if the membranes have the desired characteristics.

In the operation of a separator of the type disclosed herein, when the mixture of liquids to be separated consists of a hydrocarbon in the continuous phase and water in the dispersed phase, the mixture is introduced into the chamber 7 by means of the inlet 9. It will be noted that the inlet is placed to the right of the ends of the coalescing units 12. This insures that the stream of the liquid mixture will not impinge upon the surface of the coalescing membranes and thereby cause them to break down after only a short period of use. The mixture then passes from the outside to the inside of the coalescing units 12 and around the outside of the chamber 7 to the vertical portion of the casing. When passing through the coalescing membrane the liquid is filtered and small globules of the dispersed phase become enlarged as they gather together due to the coalescing action. The space between the wall 11 of the chamber 7 and the cap 5 is large enough so that turbulence of the liquid is reduced to a minimum as its direction of flow is being reversed from a movement toward the left to a movement toward the right around the outside of chamber 7. It is noted that a tendency for turbulence to be created is also reduced by the shape of the left ends of castings 21. These castings are so formed that no sharp edges occur in the fluid path as it leaves the units 12. As the liquid flows around chamber 7 there is a tendency for the heavier liquid, that is the water, to settle to the bottom while the lighter liquid, which is the hydrocarbon, will rise to the top of this chamber. The horizontal run of the two liquids past chamber 7, as well as their vertical movement in the container gives a chance for the liquids to begin to settle out by gravity and therefore reduce the load on the separating membranes 31 and 32.

The membrane 31 has been treated in any suitable fashion to render it hydrophobic, therefore it will repel any droplets of water that may be carried with the hydrocarbon to this point in the container. The hydrocarbons will pass through the separating membrane 31 from the outside to the inside and will be drawn off through the outlet 15, while any droplets of water carried to this point will gather upon the surface of membrane 31 and fall toward the bottom of the container.

The membrane 32 has been treated to render it hydrophilic so that the water which settles to the bottom of the container will pass through this membrane to the interior of the separating unit and may be drained off through the outlet 18. Any droplets of the hydrocarbon carried by the water will be stopped by membrane 32, and will rise to the top of the container.

In some cases there may be such a small quantity of dispersed phase of the mixture that it is not advisable to withdraw continuously the liquid during the separating process. In this case valve 19 will be closed until a quantity of the dispersed phase has collected in the bottom of the container which will warrant the withdrawal thereof. The amount of the dispersed phase that collects in the bottom of the container can be determined through the gauge glass 33. When enough of the liquid has collected to warrant drawing off, valve 19 is opened and the dispersed phase is permitted to run through the separating membrane 32 and out of the outlet 18.

In other cases there may be relatively larger flow of the dispersed phase of the liquid. If this is so, the valve 19 may be opened slightly to permit a small continuous flow of liquid through outlet 18 sufficient to maintain the interface of the two liquids at the desired level. Or the outlet 18 may be brought in a bend up the side of the separator to a point where the weight of the liquid in the outlet is sufficient to support the interface at the desired level.

Regardless of the quantity of the dispersed phase of the liquid that is being removed it is desirable to maintain the level of the interface of the two liquids at some point above the upper ends of the separator units 17. Generally speaking the interface level will be maintained between the upper ends of separator units 17 and the lowest part of the horizontal projection 2.

From the above description, it will be seen that I have provided an efficient liquid separating unit which has a relatively large capacity because of the fact that a number of coalescing units as well as the number of separating units can be used in parallel to obtain the desired volume. The arrangement is such that the coalesced liquid flows through a relatively confined path and in a horizontal direction for a distance that is sufficient to begin the initial separation of the two fluids by gravity. This path of movement of the liquid as it runs from the left or outer end of the coalescing membrane 12 to the vertical portion of container 1 has sufficient length to permit the initial separating to take place. Thereafter as the liquid passes through the vertical portion of the container 1 there is the tendency for the heavier liquid to move to the bottom and the lighter liquid to move to the top. In this way the load on the separating membranes, which perform the actual separating, is considerably reduced over what would be the case if the liquid was passed directly from the coalescing membrane to the separating membranes. By providing two separate membranes, one of which will pass one of the liquids and repel the other, while the second will pass the second liquid and repel the first, insures that a complete separation of the two liquids will be obtained. Because of the construction disclosed an entirely dry hydrocarbon will be removed from the outlet 15 while water, entirely free of the hydrocarbon will be removed from the outlet 18.

The construction of the device is such that the various separating elements may be readily removed for replacement and for cleaning and the device is rugged enough to withstand the type of use that it will receive in an industrial plant. When using the separator it is only necessary to provide joints in a pipe through which the liquids to be separated are flowing so that the three connections to the inlet 9 and the outlets 15 and 18 may be made. It will therefore be seen that the separator devised by me has a large capacity and is rugged and simple to operate as well as to service.

While in accordance with the provisions of the statutes, I have illustrated and described the best form of embodiment of my invention now known to me it will be apparent to those skilled in the art that changes may be made in the form of the apparatus disclosed without departing from the spirit of my invention, as set forth in the appended claims, and that in some cases certain features of my invention may be used to advantage without a corresponding use of other features.

What is claimed is:

1. Apparatus for separating a plurality of immiscible liquids of different specific gravities comprising in combination a vertically extending container having a horizontally extending portion projecting therefrom, means forming a chamber located in said horizontal portion and separated therefrom, an inlet extending into the interior of said chamber adjacent to the vertical portion of said container, outlets formed at the top and bottom of said container, coalescing-membrane means separating the interior of said chamber from the interior of said container adjacent to the outer end of said horizontal portion, through which the liquids entering said chamber must flow into said container where they tend to separate by specific gravity differences, and separating membrane means located in the container adjacent to one of said outlets, said separating membrane means being treated to pass the liquids moving toward the same and repel the other, whereby said liquid will pass through said separating membrane means and the outlet adjacent thereto and the other liquid will pass through the other outlet.

2. Apparatus for separating a plurality of immiscible liquids of different specific gravities comprising in combination a vertically disposed container, means forming a plurality of concentric chambers extending horizontally from said container, the outer chamber being in communication therewith, coalescing membrane means separating the interior of the inner chamber from said outer chamber, an inlet for the liquids to be separated extending into the interior of the inner chamber, the liquids passing from the inner chamber through said coalescing membrane means to the outer chamber and to said container where they tend to separate by gravity, an outlet adjacent to the top and an outlet adjacent to the bottom of said container, and separating membrane means treated to pass the liquid moving toward the same and repel the other located in said container over one of said outlets.

3. Apparatus for separating a plurality of immiscible liquids of different specific gravities including in combination a vertically disposed container having a horizontally projecting portion, means forming a chamber in said horizontal portion, an inlet for the liquids extending into said chamber, a plurality of coalescing membrane units separating the interior of said chamber from said horizontal portion, and through which the liquids must pass to reach said container, an outlet adjacent to the top and an outlet adjacent to the bottom of said container, a plurality of separating membrane units located in said container in front of one of said outlets, said separating membrane units being treated to pass the liquid flowing through said one outlet and repel the other, and means to detachably support said separating membrane units in position.

4. In apparatus for separating a plurality of immiscible liquids of different specific gravities, the combination of a container, an inlet extending into said container, a coalescing membrane unit including a coalescing membrane and a support therefor, a partition located in said container in the path of flow of the liquids downstream from said inlet, said partition having an opening therein, means to detachably fasten said support to said partition across said opening whereby liquid flowing to said container will have to pass through said coalescing membrane, a separating membrane unit including a separating membrane and a support therefor, said separating membrane being treated to pass one liquid and repel the other, means forming an outlet for said container, a second partition having an opening therein located in said container in front of said outlet, means to detachably fasten the support for said separating membrane over the opening in said second partition whereby the liquid passing said separating membrane to leave said container must pass through the same, and a second outlet in said container for the liquid repelled by said separating membrane.

5. In apparatus for separating a plurality of immiscible liquids of different specific gravities the combination of a container, a partition in said container having an opening therein, an inlet on one side of said partition and an outlet on the other side thereof, a membrane unit placed across the opening and comprising a perforated cylindrical support, a membrane attached to the exterior of said support and covering the perforations thereof, one end of said support being closed, a collar attached to the other end of said support, said collar being provided with an outwardly extending flange adapted to abut against one face of said partition when the support and membrane are passed through the opening, and means to detachably fasten said collar to said partition.

6. Apparatus for separating a plurality of immiscible liquids of different specific gravities including a container, a partition in said container, said partition having a number of openings formed therein, a separating unit comprising a perforated cylindrical support having one end thereof closed, a separating membrane around said support and covering the perforations thereof, a collar attached to the open end of said support and of a size to be received by an opening, a flange extending radially of said collar to lie against one side of said partition, means to fasten detachably said flange to said partition, an inlet for said container on one side of said partition and an outlet therefore on the other side of said partition.

7. In apparatus for separating a plurality of immiscible liquids of different specific gravities the combination of a vertically disposed container having a horizontally extending portion, means forming a chamber having one end closed and one end open located concentrically in said horizontal portion with the closed end adjacent the vertical portion of the container, an inlet for the liquids to be separated extending into the interior of said chamber, coalescing membrane means closing said open end and separating the interior of said chamber from the interior of said horizontal portion and located adjacent to the outer end thereof whereby liquid passing from the interior of said chamber must flow around the outside thereof, the liquids tending to separate by gravity as they are flowing, a perforated partition located adjacent to each end of said container, separating membrane means closing the openings of each partition, the upper separating membrane means being treated to pass the lighter liquid and repel the heavier, and the other separating membrane means treated to pass said heavier liquid and repel the said lighter liquid, and outlets for said container beyond each partition, whereby the lighter liquid will pass through the upper separating membrane unit and out of one outlet and the heavier liquid will pass through the other separating membrane unit and out of the lower outlet.

8. Apparatus for separating a plurality of immiscible liquids of different specific gravities including in combination a container providing a horizontal path of flow for the liquids and a vertical space extending above and below said path at one end thereof, coalescing membrane means located adjacent to the beginning of the horizontal path of flow, an inlet in front of said membrane through which the liquids pass and beyond which they tend to separate by gravity as they are flowing, a first outlet at the upper end of said vertical space, a second outlet adjacent the lower end of said vertical space, first separating membrane means treated to pass the lighter liquid and repel the heavier liquid, means to mount said first membrane means adjacent to the upper portion of said vertical space and in front of said first outlet, second separating membrane means treated to pass the heavier liquid and repel the lighter liquid, and means to mount said second membrane means adjacent to the lower portion of said space and in front of said second outlet.

9. Apparatus for separating a plurality of immiscible liquids including a continuous phase of one specific gravity and a dispersed phase of another specific gravity including in combination a vertically extending container having an outlet at each end, a partition provided with openings in said container in front of each outlet, separating membrane means treated to pass the light phase of the liquid and repel the heavy phase fastened over the openings in the partition near the upper end of the container, separating membrane means treated to pass the heavy phase of the liquid and repel the light phase fastened over the openings of the partition near the lower end of the container, a horizontal projection on said container, coalescing membrane means located adjacent to the outer end of said horizontal projection, an inlet for said container so located that all the liquid entering the same must pass through said coalescing membrane means and said horizontal projection before reaching the container, the liquids during their passage through said horizontal projection tending to separate by gravity before they reach said two separating membrane means where they are entirely separated.

10. In apparatus for separating a plurality of immiscible liquids of different specific gravities, the combination of a T-shaped container with the cross part of the T extending vertically and the stem extending horizontally, an inlet for the liquids in the stem, coalescing membrane means in said stem downstream of said inlet through which the liquids flow substantially horizontally toward said cross part and in which the coalesced liquids tend to separate by gravity, a partition having openings therein located adjacent to the upper end of said cross part and forming with the upper end thereof a space in which the lighter liquid is collected, a plurality of substantially cylindrical separating members each covered with a membrane pervious to the lighter liquid and impervious to the heavier liquid, means to fasten said separating members to said partition over the openings therein, and an outlet for the liquid collected in said space.

11. In apparatus for separating a plurality of immiscible liquids of different specific gravities, the combination of a vertically extending container, an inlet to said container, coalescing means in said inlet through which the liquids to be separated pass, means in the upper end of said container including a partition having a plurality of openings therein forming a space in which the lighter of the liquids is collected, a plurality of cylindrical elements, membrane means pervious to the lighter liquid and impervious to the heavier liquid covering each of said cylindrical elements, means to attach said cylindrical elements to said partition to cover the openings therein and with said cylindrical elements projecting into said container, and an outlet for the lighter liquid from said space.

ELVIN L. KRIEBLE.

(References on following page)

REFERENCES CITED

The following references are of record in the file of this patent:

UNITED STATES PATENTS

| Number | Name | Date |
|---|---|---|
| 217,442 | Belcher | July 15, 1879 |
| 631,371 | Kithchart et al. | Aug. 22, 1899 |
| 934,076 | Kneuper | Sept. 14, 1909 |
| 952,620 | Keyes | Mar. 22, 1910 |
| 1,049,547 | Strauss et al. | Jan. 7, 1913 |
| 1,218,738 | Zahm | Mar. 13, 1917 |
| 1,304,124 | Trumble | May 20, 1919 |
| 1,394,011 | Hills | Oct. 18, 1921 |
| 1,516,132 | Allen et al. | Nov. 18, 1924 |
| 1,584,743 | Hensley | May 18, 1926 |
| 1,804,743 | Cannon | May 12, 1931 |
| 1,947,709 | Garrison et al. | Feb. 20, 1934 |
| 2,359,386 | Reinsch | Oct. 3, 1944 |
| 2,404,872 | Walker, Jr. | July 30, 1946 |
| 2,412,841 | Spangler | Dec. 17, 1946 |
| 2,437,008 | Van Doehren | Mar. 2, 1948 |
| 2,468,382 | Taylor | Apr. 26, 1949 |
| 2,555,607 | Robinson | June 5, 1951 |